Oct. 16, 1962 L. R. HAVERBERG 3,058,133
WHEEL WASHER APPARATUS
Filed May 20, 1960 3 Sheets-Sheet 1
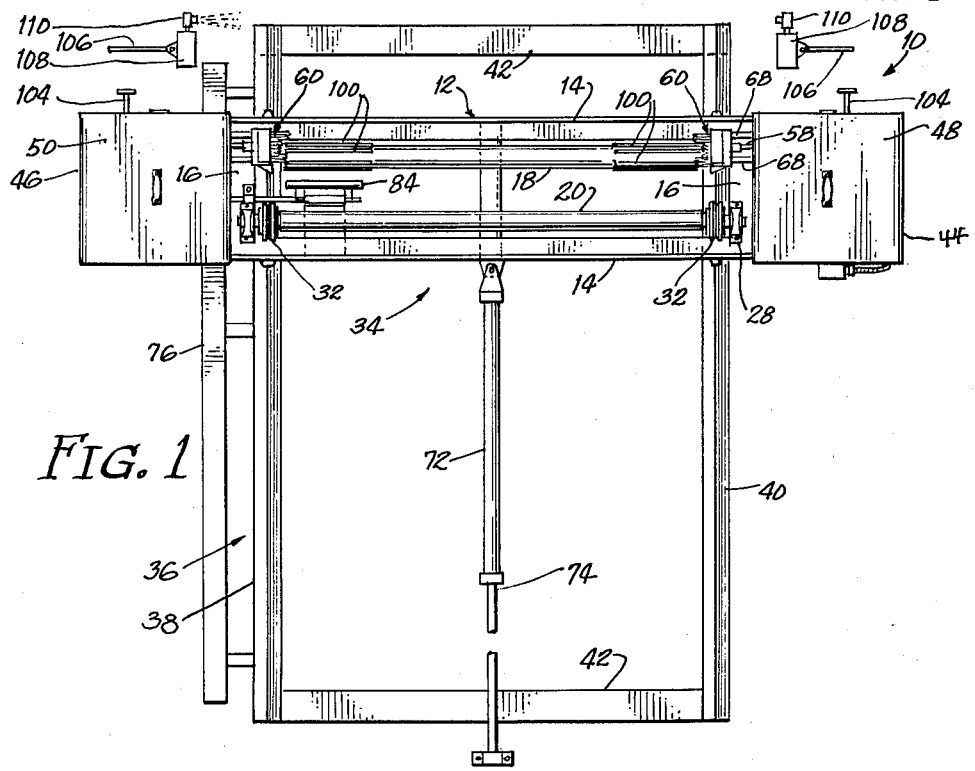
FIG. 1
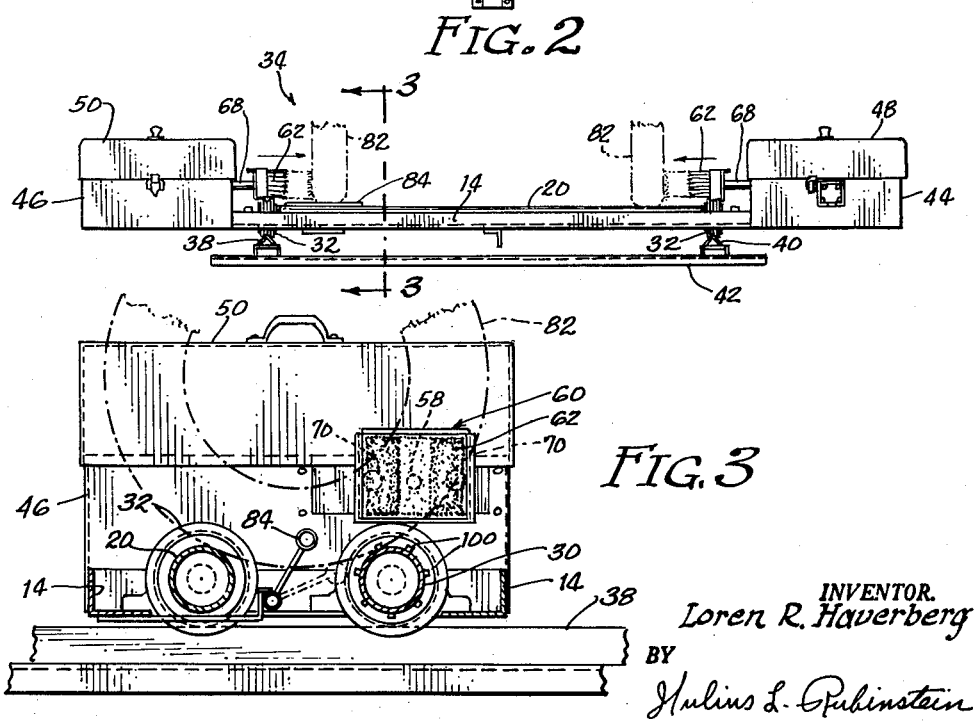
FIG. 2
FIG. 3
INVENTOR.
Loren R. Haverberg
BY
Julius L. Rubinstein
Attorney Oct. 16, 1962    L. R. HAVERBERG    3,058,133
WHEEL WASHER APPARATUS
Filed May 20, 1960    3 Sheets-Sheet 2
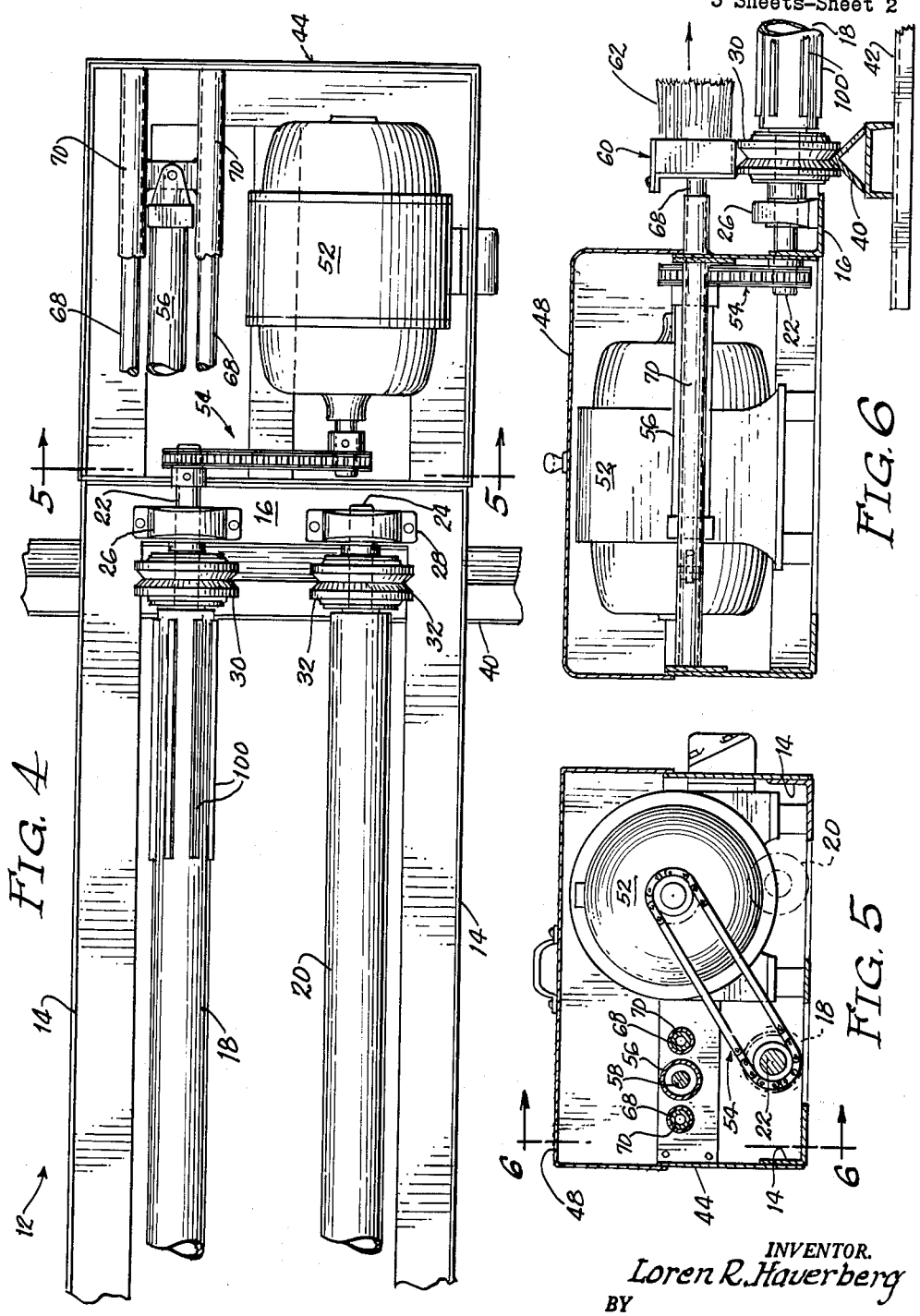
INVENTOR.
Loren R. Haverberg
BY
Julius L. Rubinstein
Attorney

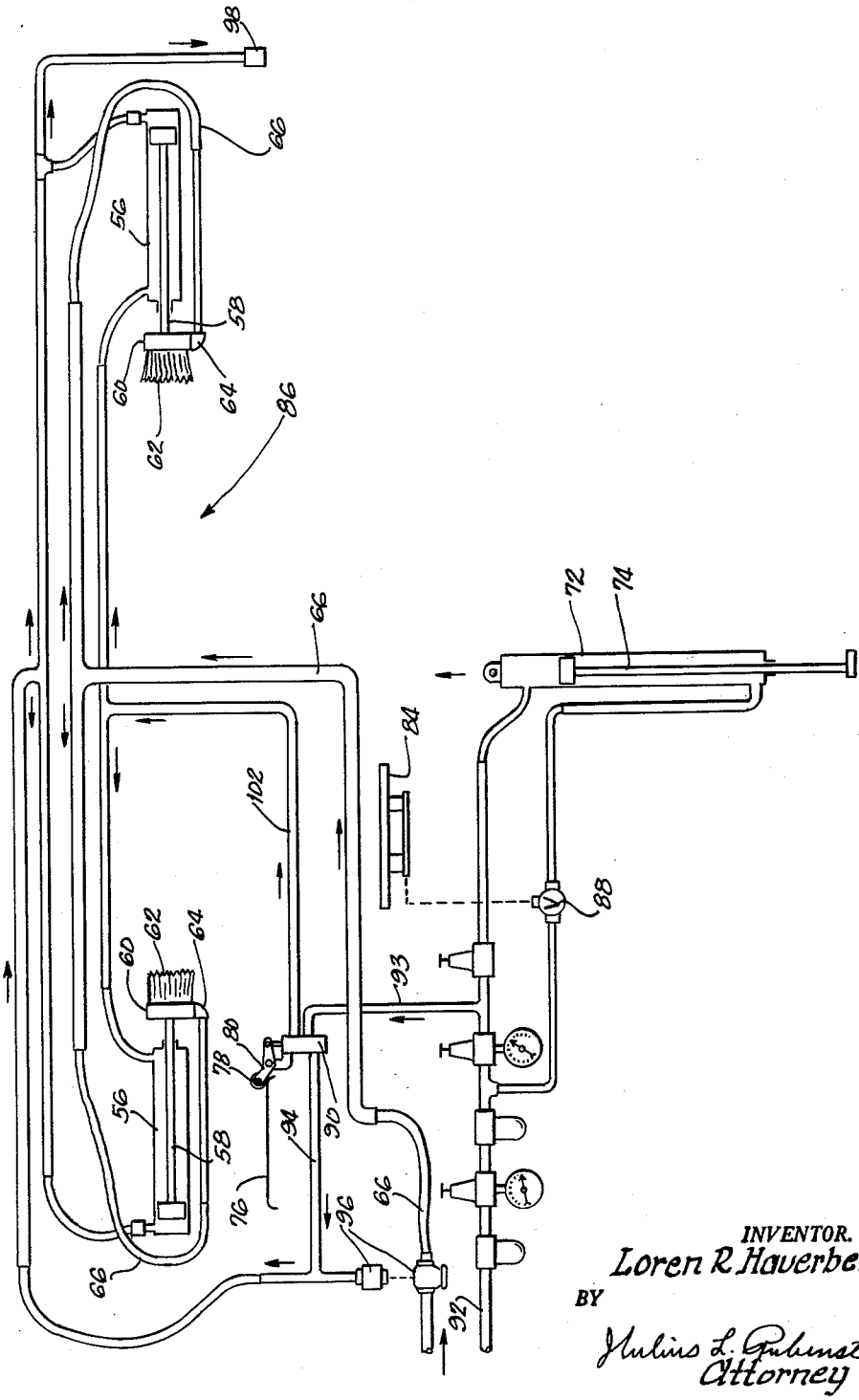

United States Patent Office 3,058,133
Patented Oct. 16, 1962

3,058,133
WHEEL WASHER APPARATUS
Loren R. Haverberg, Seattle, Wash., assignor to
Jack Flapan, Chicago, Ill.
Filed May 20, 1960, Ser. No. 30,531
4 Claims. (Cl. 15—21)

This invention relates to automobile laundry equipment and more particularly to a wheel washing machine for motor vehicles.

In the past, wheel washing machines for motor vehicles such as that described in the patent to Haverberg, No. 2,718,650, have been developed and used commercially. These machines were satisfactory from a functional standpoint, but they required the motor vehicle to remain in a fixed position while its wheels were being washed.

This arrangement is objectionable from an economic standpoint because wheel washing machines are usually mounted in an auto laundry which is geared to wash a vehicle completely in only a few minutes. In such an establishment, the vehicles are often attached to a moving endless chain which pulls them through the various cleaning and drying stations. This chain is normally connected to a number of vehicles which are in process of being washed. Consequently with the above described wheel washing machine, it was necessary to stop the chain when a vehicle arrived at a wheel washing machine. This was objectionable because the speed of movement of the vehicles through the auto laundry was regulated by the speed of the wheel washing machine.

To avoid this, it was common practice to have someone disconnect the vehicle from the chain as it reached the wheel washing machine. Then after the wheels were washed, someone had to reconnect the vehicle to the chain so it could be pulled away to the next station. Alternatively, an operator had to be available to drive the car onto the wheel washing rollers, and then when the wheels were washed, the car had to be driven away. But these procedures were awkward and wasteful of labor. In addition, holding the vehicle in a fixed position while the wheels were being washed decreased the number of vehicles that could be washed per unit of time and this lessened the productivity of the auto laundry.

To overcome this disadvantage, other wheel washing machines such as that exemplified by the patent to Haverberg, No. 2,837,759, were developed. These machines were designed to wash the wheels of the vehicle while the vehicle was being dragged through the auto laundry. This eliminated the necessity of stopping the moving chain or of disconnecting the vehicle therefrom. These wheel washers consisted of several powered rollers mounted in spaced parallel relation to each other along with an appropriate scrubbing mechanism, so that as the vehicle wheels were dragged over these rollers the wheels were kept spinning while they were being washed. This arrangement was desirable from an economic standpoint. On the other hand these machines and their installation were rather costly.

Instead of using a plurality of powered rollers in spaced parallel relationship, an equivalent structure has been proposed. This equivalent structure involved mounting the structure shown in the patent to Haverberg, No. 2,718,650, on rails so that the entire wheel washing mechanism can move with the vehicle for a distance sufficient to wash the wheels. The difficulty in making such a modification is not in merely mounting the structure shown in the Haverberg patent, No. 2,718,650, on rails. The real problem is in designing such a structure so its cost and the cost of its installation is not increased to any objectionable extent.

What is needed therefore and comprises an important object of this invention is to provide a wheel washer for motor vehicles which includes all the above described desirable features.

This and other objects of this invention will become more apparent when read in the light of the accompanying drawing and specification wherein:

FIG. 1 is a plan view of the improved wheel washing machine showing its balanced carriage mounted on the guide rails;

FIG. 2 is an elevational view of the improved wheel washing machine shown in FIG. 1;

FIG. 3 is a sectional view taken on the line 3—3 of FIG. 2;

FIG. 4 is an enlarged plan view of a part of the improved wheel washing machine with the cover of a housing and brush and nozzle removed showing the motor mounted therein;

FIG. 5 is a sectional view taken on the line 5—5 of FIG. 4;

FIG. 6 is a sectional view taken on the line 6—6 of FIG. 5; and

FIG. 7 is a view of the hydraulic control circuit for the wheel washer.

Referring now to FIG. 1 of the drawing, a wheel washing machine indicated generally by the reference numeral 10 comprises a frame 12. The frame is rectangular in shape and consists of spaced parallel side and end members 14 and 16. These members are angle shaped in cross section for greater strength. As best seen in FIG. 4, roller bars 18 and 20 are mounted on frame 12. These roller bars have reduced ends 22 and 24 which are rotatably mounted in bearings 26 and 28 attached to end members 16. In addition, in this particular embodiment the reduced ends 22 and 24 of the roller bars extend inside roller wheels 30 and 32, and in such a way that they serve as axles so the roller wheels can freely rotate thereon (see FIG. 3). With this arrangement, the frame 12 and roller wheels 30 and 32 constitute a carriage 34. It is apparent that mounting the roller wheels 30 and 32 on the reduced ends of the roller bars is a desirable and economical way to form the carriage, but it is understood that the roller wheels could be separately mounted on different parts of the frame.

A track 36 is provided for the carriage 34 (see FIG. 1). In this embodiment, the track consists of spaced parallel rails 38 and 40 connected together in spaced parallel relationship by transverse tie bars 42. The track is preferably assembled at the factory in order to eliminate difficulties and expense in aligning and spacing the rails when the track is being installed.

Housings 44 and 46 are mounted at each end of frame 12 (see FIGS. 1 and 2). Access to the interior of these housings is provided by means of removable covers 48 and 50. As best seen in FIGS. 4, 5 and 6, an electric motor 52 is mounted in housing 44 in upwardly spaced relation to track 36. This is important because the motor moves with the carriage. With this arrangement, it is not necessary to go to the expense of providing an elongated motor receiving trench requiring a sewer system, which would be necessary if the motor were carried below the track. Furthermore, holding the motor above the track is safer because there is no danger of the sewer backing up and flooding the electric motor. Besides this, the motor and other mechanical parts are more accessible for servicing.

As best seen in FIG. 4, the motor 52 is connected to roller bar 18 by means of a conventional chain sprocket drive 54. Consequently, when the motor operates, roller bar 18 rotates.

A brush control cylinder 56 is rigidly mounted in each housing (see FIGS. 4, 6 and 7). A double acting piston 58 is slidably mounted in each cylinder so that a suitable valve system permits the double acting pistons in the cylinders to move back and forth simultaneously under hydraulic pressure.

A brush holding assembly 60 including a brush 62 is secured to the outer end of each piston 58 (see FIG. 6). As will become apparent below, with this arrangement, the brush can be selectively moved to and from a scrubbing position, whereby the bristles of the brush may be urged against a side of the vehicle wheels with a force determined by the fluid pressure on the piston.

As best seen in FIG. 7, a nozzle 64 is mounted on and movable with each brush assembly. These nozzles are connected to a supply line 66 which carries a cleaning fluid such as a mixture of steam and detergent. As will be described below, these nozzles are for the purpose of spraying the cleaning fluid against the side of vehicle wheels to be washed. It is apparent that it is also possible for the nozzles to be mounted directly on the housings in a fixed position with respect thereto rather than on the brush assemblies. All that would be necesary is for the pressure in the supply line 66 to be a little greater so that the steam cleaning fluid leaving the nozzle would reach the side of the wheels.

Since the brushes carry the nozzles, in the particular embodiment shown, it is important to keep each brush and nozzle properly aligned with respect to the vehicle wheels to be washed. To do this, guide bars 68 in spaced parallel relation to piston 58 are rigidly secured to the brush assembly (see FIGS. 1, 3 and 4). The opposite end of guide bars 68 are slidable in sleeves 70, which are rigidly secured sides of the housings, so that when the brush assembly 60 is retracted away from a vehicle wheel the guide bars 68 telescope inside the sleeves 70. With this arrangement, the brush assembly 60 cannot rotate on the axis of piston 58, and the brush 62 and nozzles 64 are kept in correct alignment.

A cylinder 72, for moving the carriage 34 is also provided. As seen in FIG. 1, this cylinder is slidably mounted on a piston 74. Piston 74 is attached at one end to a conventional fixed support; e.g., the floor. The free end of the cylinder is secured to the carriage 34, and in such a way that movement of cylinder 72 over piston 74, pulls carriage 34 along track 36.

Track 36 is provided with a cam rail 76 which is rigidly secured to and parallel with rail 38. The track 36 along with cam rail 76 are assembled as a unit at the factory for ease of installation. A cam roller 78 for rolling on the cam rail 76 is provided (see FIG. 7). This cam roller is rotatably mounted on one arm of the two-arm pivotally mounted control lever 80, for reasons to be described below. This cam roller 78 and lever 80, along with other hydraulic equipment are mounted in and movable with housing 46. This arrangement is advantageous because the hydraulic equipment in housing 46 serves as a counter-weight to the electric motor in housing 44. In this way the carriage will be balanced and will ride on track 36 more easily.

In automobile laundries, the vehicle being washed is usually hooked onto a moving endless chain and is pulled thereby through various cleaning stations. When some of the wheels 82 of the vehicle are pulled onto the roller bars 18 and 20 they actuate member 84 which is part of the hydraulic control system indicated generally by the reference numeral 86 (see FIGS. 1 and 7). At the same time, the endless moving chain (not shown), pulling the vehicle, is indirectly, through pulling the vehicle, also pulling the carriage 34 along track 36. Cam rail 76 is positioned so movement of carriage 34 quickly causes cam roller 78 to encounter cam rail 76, thereby actuating control lever 80.

Member 84 is mechanically connected to valve 88. This valve is connected to carriage moving cylinder 72 in such a way that when it is actuated in one way, cylinder 72 and piston 74 can move apart.

When cam roller 78 moves onto cam rail 76 and actuates control lever 80, a number of things happen. First of all valve 90 connected to control lever 80 is operated in such a way that air pressure from high pressure lines 92 and 93 enters line 94. When this happens, the pressure in line 94 causes the normally closed pressure responsive valve 96 to open. This valve is in line 66 which conducts the cleaning fluid to nozzles 64 so that jets of cleaning fluid leave these nozzles. At the same time pressure in line 94 affects and operates a conventional pressure controlled electric switch 98 so that the electric motor 52 starts to operate.

Operation of the electric motor causes roller bar 18 to rotate. This roller bar is provided with axially extending cleats or serrations 100, which when a vehicle wheel 82 is resting on the roller bars, engage the tires of the wheels in such a way that rotation of roller bar 18 causes the vehicle wheels 82 to spin.

Pressure in line 94 also communicates with one side of the double acting pistons 58 and causes them to move out of the brush control cylinders 56 until the brushes 62 are forced against the sides of the vehicle wheels 82.

In summary to this point, when the wheels 82 of a vehicle are dragged onto the roller bars 18 and 20, the chain pulling the vehicle pulls the carriage 34 with the vehicle along track 36. At the same time, the electric motor starts causing roller bar 18 to rotate. This causes the wheels 82 to spin. Simultaneously, the brushes 62 move into scrubbing engagement with the sides of spinning wheels and a cleaning solution from nozzles 64 is sprayed against the sides of the wheels. With this arrangement, the sides of the vehicle wheels are scrubbed clean.

As the carriage 34 reaches the limit of its travel, cam roller 78 rolls off of cam rail 76. This causes control lever 80 to actuate valve 90 and to restore it to its initial position. When valve 90 is in its initial position, air pressure from lines 92 and 93 leave valve 90 through line 102. This cuts off the pressure in line 94 and causes the normally closed valve 96 to again close off the supply of cleaning fluid to the nozzles. In addition, the pressure actuated electric switch 98 opens so that electric motor 52 stops. At the same time pressure in line 102 causes the double acting pistons 58 to move back into the brush control cylinders 56 so that the brushes 62 are retracted out of scrubbing engagement with the sides of the wheels.

After the carriage has moved as far as it can go, the endless chain (not shown) attached to the vehicle pulls the vehicle so wheels 82 move off rollers 18 and 20. This releases actuating member 84 so valve 88 operates. Then pressure in line 92 causes cylinder 72 to move so it telescopes onto piston 74. This movement of cylinder 72 pulls carriage 34 back to its initial position in time to receive the rear wheels or the wheels of the next vehicle being washed. It is noted that cylinder 72 is designed so that when it moves back over piston 74, a certain amount of air is compressed in the cylinder giving cylinder 72 the additional function of acting as a shock absorber for the carriage. As the carriage 34 reaches the limit of its travel, and just before the wheels 82 are pulled off the roller bars, a push member 104 rigidly secured to housing 46 engages an arm 106 of a valve mechanism 108. This valve mechanism operates in such a way that when the arm 106 is actuated, it causes a predetermined quantity of water to be directed by fixed rinse nozzles 110 against the sides of the vehicle wheels in order to rinse off the cleaning solution therefrom.

The invention may be embodied in other forms without departing from the spirit or essential characteristics thereof as set forth in the claims, and the present embodiment is therefore to be considered as illustrative and not restrictive, and it is intended to include all changes which come within the scope and range of the claims.

I claim:

1. In a wheel washing machine, a frame, roller wheels rotatably attached to said frame to form a carriage, a support, a track mounted on said support, said roller wheels positioned on said track whereby said carriage is movable along said track, an electric motor mounted on said carriage in upwardly spaced relation to said track, a pair of parallel wheel receiving roller bars rotatably mounted on said carriage and positioned in a plane parallel to said track and generally transverse with respect thereto, said electric motor connected to at least one roller bar whereby operation of said motor causes said at least one roller bar to rotate, a pair of brushes, said brushes mounted on opposite sides of said carriage for movement generally toward each other over the carriage, driving means connected to each brush for selectively driving each brush over the carriage for movement into and out of engagement with a pair of vehicle wheels received by said roller bars, nozzles carried by said carriage and associated with each brush, each nozzle adapted to be connected to a source of cleaning fluid for directing said cleaning fluid against the sides of wheels received by said roller bars, moving means for moving said carriage along said track, and control devices associated with said electric motor, the driving means connected to said brushes, said nozzles, and the said means for moving said carriage along said track, at least one actuator for said control devices, said actuator associated with said carriage in such a way that when a pair of wheels on a vehicle moves onto said roller bars in such a way that the axes of said wheels and said roller bars are parallel said control devices are actuated causing said electric motor to operate and rotate at least one roller bar whereby said vehicle wheels rotate, said nozzles direct cleaning fluid against the sides of the rotating wheels, and said brushes moving into scrubbing engagement with the sides of said rotating wheels, and means for turning off said electric motor, retracting said brushes out of scrubbing engagement with said rotating vehicle wheels, stopping the cleaning fluid directed from said nozzles, and moving said carriage back to its initial position after said carriage has been moved a predetermined distance along said track.

2. In a wheel washing machine, a frame, roller wheels rotatably attached to said frame to form a carriage, a supporting surface, a track mounted on said supporting surface, said roller wheels in rotatable engagement with said track whereby said carriage is movable along said track, an electric motor mounted on said carriage in upwardly spaced relation to said track, a pair of wheel receiving parallel roller bars rotatably mounted on said carriage and positioned in a plane parallel to said track and generally transverse with respect thereto, said electric motor connected to at least one roller bar whereby operation of said motor causes said at least one bar to rotate, a pair of cylinders, said cylinders mounted on said carriage on opposite sides thereof, a piston slidably mounted in each cylinder, means for supplying fluid under pressure to each cylinder for movement of said pistons therein, a brush connected to each piston, said cylinders mounted so when fluid under pressure is admitted therein said pistons move in said cylinder causing said brushes to move generally toward each other over the carriage, nozzles carried by said carriage and associated with each brush, each nozzle adapted to be connected to a source of cleaning fluid for directing said cleaning fluid against the sides of vehicle wheels received by said roller bars, a driving cylinder, a driving piston movably mounted in said driving cylinder with one end of the piston attached to a fixed support, said driving cylinder mounted on and movable over said driving piston with one end of said driving cylinder secured to said carriage, means for supplying fluid under pressure to said driving cylinder to cause said cylinder to move said carriage along said track, and a hydraulic system including control devices, said control devices associated with said electric motor, said pair of cylinders on the sides of said carriage, said nozzles, and said driving cylinder, at least one actuator for said control devices, said actuator positioned on said carriage in such a way that when a pair of wheels on a vehicle moves onto said roller bars with the axes of the wheels parallel to the axes of said roller bars, said control devices are actuated causing said electric motor to operate and rotate at least one roller bar whereby the vehicle wheels received by said roller bars rotate, fluid under pressure is admitted to said cylinders on the sides of said carriage causing said brushes to move into scrubbing engagement with the sides of said vehicle wheels, and said nozzles direct cleaning fluid against the sides of the vehicle wheels, and means for turning off said electric motor, moving said brushes out of scrubbing engagement with said vehicle wheels, stopping the cleaning fluid directed from said nozzles, and moving said carriage back to its initial position after the carriage has been moved a predetermined distance along said track.

3. In a wheel washing machine, a frame, roller wheels rotatably mounted on said frame to form a carriage, a supporting surface, a track mounted on said supporting surface, said track formed from rails connected together in spaced parallel relationship, said roller wheels in rotatable engagement with said track whereby said carriage is movable along said track, a housing mounted on each side of the carriage, an electric motor mounted in one housing in upwardly spaced relation to said track, a pair of wheel receiving roller bars rotatably mounted on said carriage in a plane parallel to said track and generally transverse with respect thereto, the ends of said roller bars extending through the center of said roller wheels and freely rotatable therein, said electric motor connected to at least one roller bar whereby operation of said motor causes said at least one roller bar to rotate, a brush control cylinder mounted on each housing, a double acting piston slidably mounted in each cylinder, first valve means associated with the double acting pistons for selectively supplying fluid under pressure to either side of the double acting pistons, a brush holding assembly and a brush held thereby connected to each piston for selected travel toward each other over the carriage, a nozzle associated with each housing and connected to a cleaning fluid supply line for directing the cleaning fluid against the sides of the wheels to be washed, a normally closed valve in said cleaning fluid supply line for shutting off the supply of cleaning fluid to said nozzles, a carriage moving cylinder, a piston secured at one end to a fixed support, said carriage moving cylinder slidably mounted on said piston, one end of said carriage moving cylinder secured to said carriage, second valve means for supplying pressure to one side of said piston whereby operation of said second valve means causes said carriage moving cylinder to move said carriage along said track, the opposite end of said piston cooperating with the closed end of said cylinder to compress the air therebetween when said carriage moving cylinder moves over said piston whereby said piston and said carriage moving cylinder additionally function as a shock absorber for the carriage, and a hydraulic system including control devices, at least a part of the hydraulic system mounted in the other housing to balance the carriage, said hydraulic system control devices connected to said electric motor, to said brush control cylinders, to said normally closed valve, and to said carriage moving cylinder, at least one actuator for said control devices, said actuator positioned on said carriage in such a way that when a vehicle moves onto said carriage so that the vehicle wheels are received by said roller bars said control devices are actuated to cause said electric motor to operate and rotate at least one roller bar whereby said vehicle wheels spin, and causes said normally closed valve to open so said nozzles direct streams of cleaning fluid against the sides of the vehicle wheels, and causes said source of fluid under pressure to affect said double acting pistons and the brushes connected thereto so they move into scrubbing engagement with the sides of said vehicle wheels, the movement of a vehicle onto said carriage causing said carriage to move along said track, and means for turning off said electric motor, reclosing said normally closed valve, retracting said brushes from their scrubbing engagement with said vehicle wheels, and moving said carriage moving cylinder back over said piston whereby said carriage is pulled back to its initial position after said carriage has been moved a predetermined distance along said track and the vehicle wheels have moved off of said roller bars.

4. The wheel washing machine described in claim 3 wherein a push member is mounted on at least one housing, a lever arm mounted in fixed relation to said track and in the path of said push member on said one housing, said lever arm positioned so it is engaged by said push member when said carriage reaches the limit of its travel, and rinse nozzles mounted in fixed relation to said track and adapted to direct a rinsing fluid against the sides of the vehicle wheels to rinse the cleaning solution therefrom, and a valve mechanism controlled by said lever arm and operable to send a predetermined quantity of rinsing fluid through the rinse nozzles each time the lever arm is engaged by said push member.

References Cited in the file of this patent
UNITED STATES PATENTS

| | | |
|---|---|---|
| 2,837,759 | Haverberg | June 10, 1958 |
| 2,857,605 | Weishaar | Oct. 28, 1958 |